US008633891B2

(12) United States Patent
Nagai et al.

(10) Patent No.: US 8,633,891 B2

(45) Date of Patent: Jan. 21, 2014

(54) PROTRUSION PATTERN FORMING DEVICE WITH DISPLAY FUNCTION

(75) Inventors: Nobuyuki Nagai, Kanagawa (JP); Masahiro Sawaguchi, Kanagawa (JP)

(73) Assignee: Sony Corporation (JP)

( * ) Notice: Subject to any disclaimer, the term of this patent is extended or adjusted under 35 U.S.C. 154(b) by 819 days.

(21) Appl. No.: 12/832,638

(22) Filed: Jul. 8, 2010

(65) Prior Publication Data

US 2011/0012828 A1 Jan. 20, 2011

(30) Foreign Application Priority Data

Jul. 17, 2009 (JP) ................................ 2009-169243

(51) Int. Cl.
*G09G 5/00* (2006.01)

(52) U.S. Cl.
USPC ........... 345/156; 345/173; 310/330; 359/228; 434/113

(58) Field of Classification Search
USPC .................. 345/156–157, 173–179; 359/228; 379/52; 434/112–117, 126; 310/330–332, 328, 800
See application file for complete search history.

(56) References Cited

U.S. PATENT DOCUMENTS

| | | | | |
|---|---|---|---|---|
| 7,583,009 | B2 | 9/2009 | Nagai et al. | |
| 2007/0114116 | A1* | 5/2007 | Nagai et al. | 200/181 |
| 2007/0184238 | A1* | 8/2007 | Hockaday et al. | 428/98 |
| 2009/0279158 | A1* | 11/2009 | Peeters et al. | 359/228 |

FOREIGN PATENT DOCUMENTS

| | | |
|---|---|---|
| JP | 2007-143300 | 6/2007 |
| JP | 2009-046649 | 3/2009 |

* cited by examiner

*Primary Examiner* — Lun-Yi Lao
*Assistant Examiner* — Md Saiful A Siddiqui
(74) *Attorney, Agent, or Firm* — Sheridan Ross P.C.

(57) ABSTRACT

A protrusion pattern forming device with a display function includes a transparent elastic sheet having an internal layer including colored liquid, and an actuator including a plurality of actuator elements disposed along one surface of the elastic sheet, each of the actuator elements changing its own shape in response to an application of a voltage, thereby allowing the surface of the elastic sheet to protrude. A protrusion pattern is formed on the elastic sheet, and a dot pattern corresponding to the protrusion pattern is displayed on the elastic sheet by selectively driving the plurality of actuator elements.

12 Claims, 14 Drawing Sheets

1
11
21 MODE INPUT SECTION
23 MODE CONTROL SECTION
22 MEMORY
12 LINE SELECTION SECTION
13 ROW SELECTION SECTION
33
31
3
42
31
52
53
57

32B
57B
54B

XI
XI
52B, 53B 42
31

52B
53B
32B
57B 42
31

52B
53B
57B

PROTRUSION PATTERN FORMING DEVICE WITH DISPLAY FUNCTION

BACKGROUND OF THE INVENTION

1. Field of the Invention

The present invention relates to a protrusion pattern forming device with a display function not only forming a pattern of protrusions such as Braille characters but also being able to display a pattern of dots.

2. Description of the Related Art

As a continuation of barrier-free or universal design, in recent years, Braille characters or others for a similar use are often provided along, and thus are of great help to people with visual impairments in their daily lives. The Braille characters are each configured by protruding points arranged under a predetermined rule on the surface of an object to be touched by human fingers or others, and thereby each being assigned meaning or representing numbers. On the other hand, the others for a similar use as the Braille characters are not those directly assigned meaning or representing numbers, but are for various purposes including object identification, information transmission, and others. The others for such a use are found on Japanese bank notes and textured paving blocks provided on roads for guiding pedestrians, for example.

With the recent widespread use of a personal digital assistant (PDA), such a PDA is expected to be provided with various types of additional functions. As one example, the PDA may be provided with an actuator that allows very slight displacement of the PDA by electrical control. Such an actuator may be often of the piezoelectric type, but may be also of the electrostatic attraction type, the ultrasonic type, the shape-memory alloy type, or the polymer stretching type. Especially among the actuators of the polymer stretching type, a polymer actuator using an ion conductive polymer, and a polymer actuator using a polymer hydrogel or a polymer organogel are light in weight, and cause a large amount of displacement. Due to such reasons, the polymer actuators as above have been actively under study. Examples include Patent Literatures 1 and 2 (Japanese Unexamined Patent Publication Nos. 2007-143300 and 2009-046649).

In Patent Literature 1, a polymer actuator using an ion conductive polymer is described as being configured to include a film made of ion-conductive polymer (film made of ion-exchange resin), and a pair of electrodes, for example. The ion-conductive polymer film is the one impregnated with a cationic substance, and the electrodes are formed on the surface of such a film. By application of a voltage between the pair of electrodes, the ion-conductive polymer film starts swelling or shrinking, and thus becomes curved in shape or deformed. In Patent Literature 2, a polymer actuator using a polymer hydrogel or a polymer organogel is described as being configured to include a three-dimensional (3D) cross-linked polymer, and a pair of electrodes, for example. The three-dimensional cross-linked polymer is impregnated with an electrolytic solution, and the electrodes are formed on the surface of the polymer. By application of a voltage between the electrodes, the 3D cross-linked polymer undergoes the oxidation-reduction reaction, and thus becomes curved in shape or deformed. Such polymer actuators may be lighter in weight and smaller in size, and thus may be applied to a PDA for use.

In the field of art, an attempt has been made to perform video display simultaneously with the formation of a protrusion pattern. An example includes Non-Patent Literature 1 (Yoichiro KAWAGUCHI, "Technology which Creates the Advanced Space of New Traditional Arts using Super High Resolution Images and Interactive Biological Objects", [online], September 2007, Independent Administrative Institution Japan Science and Technology Agency [retrieved on Jul. 1, 2009], the Internet (URL:http://www.jst.go.jp/kisoken/crest/report/heisei18/html/mokuhyou/m okuhyou11.html)). For video display as such, a plurality of air cylinders provided on the rear surface of a screen are operated to form a protrusion pattern on the screen, and to project any video provided in advance separately onto the screen.

SUMMARY OF THE INVENTION

As to information about the Braille characters and others for a similar use (hereinafter, referred to as Braille-like information), their information details generally remain the same. In this sense, if a Braille display becomes available for displaying such Braille-like information differently anytime, users find it very useful and convenient. For implementation of such a display, using the actuators described above may be a possibility. However, if the polymer actuators described in Patent Literatures 1 and 2 above are used as they are in a display device of a PDA, a protrusion pattern is indeed formed thereby but the users may not visually perceive with certainty the resulting protrusion pattern. As a result, the users of such a display are restricted to those visually impaired, and the display is not easy to use for many able-bodied people who are not accustomed to touching the protrusion pattern by their fingers or others to recognize the characters and signs.

On the other hand, the technology described in Non-Patent Literature 1 above enables both the formation of a protrusion pattern and the display of video. Therefore, by using any dot-pattern video whose contents are synchronized with a protrusion pattern as video for projection, the protrusion pattern seems to be possibly projected at the same time with the dot pattern synchronized therewith. However, the disadvantage of this technology is the size of the system because the large-sized air cylinders are used for generating the projection pattern, and a device is additionally necessitated for projection of video. As such, considering the demand for a PDA to be smaller in size and lighter in weight, applying this technology to the PDA is difficult.

The invention is proposed in consideration of the disadvantages described above, and it is thus desirable to provide a protrusion pattern forming device with a display function that allows to form a protrusion pattern at the same time as displaying a dot pattern synchronized therewith, and to implement the reduction of size and weight.

The protrusion pattern forming device with a display function according to an embodiment of the invention is provided with an elastic sheet, and an actuator. The elastic sheet is transparent, and has an internal layer including colored liquid. The actuator includes a plurality of actuator elements disposed along one surface of the elastic sheet, and each of the actuator elements changes its own shape in response to an application of a voltage, thereby allowing the surface of the elastic sheet to protrude. A protrusion pattern is formed on the elastic sheet, and a dot pattern corresponding to the protrusion pattern is displayed on the elastic sheet by selectively driving the plurality of actuator elements.

With the protrusion pattern forming device with a display function according to the embodiment of the invention, when any of the actuator elements is operated to change it own shape to protrude in the direction of the surface of the elastic sheet, the portion of the elastic sheet in the vicinity of the actuator element is pushed upward and thus a protrusion is formed. At the same time, in the pushed portion of the elastic sheet, the liquid is moved to be away therefrom because the colored liquid therein is put under pressure. After the visible obstruction is removed as such, the protruded tip of the shape-changed actuator element becomes partially visible through the elastic sheet. This protruded tip is preferably different in color from the liquid in the intermediate layer. As an example, the protruded tip may be colored black, and the liquid may be colored white. In this case, when the actuator element pushes the elastic sheet, the protruded tip in the color of black becomes visible from the portion without the white liquid. As such, a black dot is displayed on the white background. In this case, the colored liquid layer in the elastic sheet is preferably partitioned into a plurality of areas by partition walls for preventing any possible uneven distribution of the liquid.

As an alternative configuration, by a drive control section controlling a plurality of actuator elements for selective driving thereof, number of the actuator elements for driving may be changed. In this manner, the protrusion density of a protrusion pattern and the dot density of a dot pattern may be both changed.

The actuator element is possibly provided with a tongue-shaped actuation member, and a drive electrode formed to each of the both surfaces of the actuation member. This actuation member is formed by cutting out the shape of a letter of U from a sheet made of an ion conductive polymer film. This actuation member is curved in shape into a direction perpendicular to the surface of the drive electrodes by a voltage applied to the drive electrodes formed on the both surfaces thereof, and the tip end portion being the result of the shape change pushes upward the elastic sheet. For the ion conductive polymer film, a cation exchange resin is suitably used as a material. The drive electrodes are each possibly made of carbon powder and an ion conductive resin.

The actuator element may be also formed of a three-dimensional cross-linked polymer.

Other specific examples of the actuator element are as below. As an example, the actuator element may be so formed that the protruded tip thereof is spherical. The actuator may be so formed as to include a plurality of actuator elements varying in color of the protruded tips.

With the protrusion pattern forming device with a display function according to one embodiment of the invention, a plurality of actuator elements are disposed along the surface of an elastic sheet that includes an internal layer including colored liquid. With such a configuration, the formation of a protrusion pattern may be performed at the same time as displaying a dot pattern synchronized therewith, and the resulting device may be smaller in size and lighter in weight.

Other and further objects, features and advantages of the invention will appear more fully from the following description.

BRIEF DESCRIPTION OF THE DRAWINGS

FIG. 7A shows the state thereof with no application of a drive signal, FIG. 7B shows the state thereof in which ions are moving with an application of a drive signal, and FIG. 7C shows the state thereof after the movement of the ions as a result of the application of a drive signal;

FIG. 8A shows the state thereof with no application of a drive signal, and FIG. 8B shows the state thereof with an application of a drive signal;

FIG. 11A is a top view of one of polymer actuator elements, FIG. 11B is a cross-sectional view of the display element in the state with no application of a drive signal, and FIG. 11C is a cross-sectional view thereof in the state with an application of a drive signal;

FIG. 12A is a top view of a polymer actuator element related to one display element therein, FIG. 12B is a cross-sectional view of the display element in the state with no application of a drive signal, and FIG. 12C is a cross-sectional view thereof in the state with an application of a drive signal;

FIG. 14A shows the state thereof with no application of a drive signal, and FIG. 14B shows the state thereof with an application of a drive signal; FIG. 15A shows the state thereof with no application of a drive signal, and FIG. 15B shows the state thereof with an application of a drive signal.

DETAILED DESCRIPTION OF THE PREFERRED EMBODIMENTS

Figure 1:
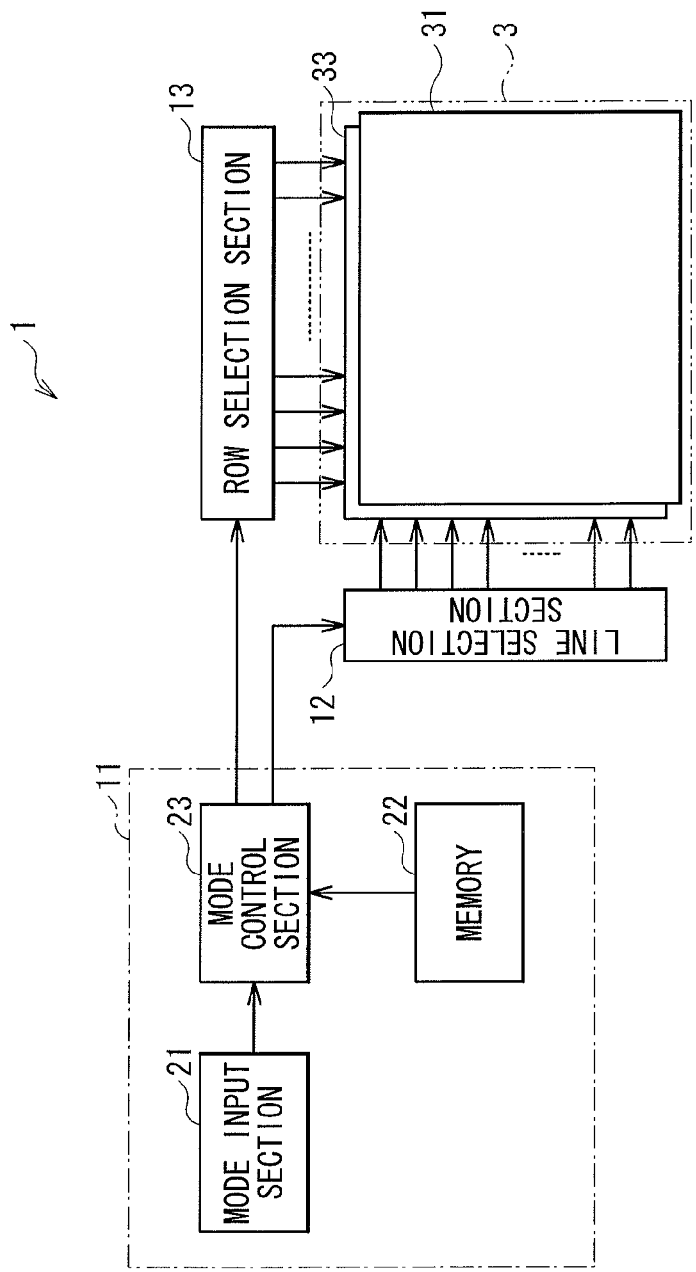
FIG. 1 is a block diagram showing an exemplary configuration of a protrusion pattern forming device provided with a display function in a first embodiment of the invention.

In the below, embodiments of the invention will be described in detail by referring to the accompanying drawings. The description will be made in the following order:

1. First Embodiment
2. Second Embodiment
3. Third Embodiment
4. Modified Examples 1. First Embodiment Exemplary Configuration Exemplary Entire Configuration FIG. 1 shows the entire configuration of a protrusion pattern forming device provided with a display function in a first embodiment of the invention. A protrusion pattern forming device with a display function 1 is configured to include a display-function-provided protrusion pattern forming section 3, a drive control section 11, a line selection section 12, and a row selection section 13.

The drive control section 11 is configured by a mode input section 21, a memory 22, and a mode control section 23. The mode input section 21 is an input interface for use to select two display modes from the outside. These two display modes are those related to formation of a protrusion pattern and display of a dot pattern in the display-function-provided protrusion pattern forming section 3. These two display modes include a high-resolution display mode, and a low-resolution display mode. In the high-resolution display mode, any information necessitating a high resolution is formed and displayed, e.g., characters and pictures, and in the low-resolution display mode, any information not necessitating a high resolution that much is formed and displayed, e.g., Braille characters and graphics. The memory 22 is for storing data of a frame for use to form and display a pattern on the display-function-provided protrusion pattern forming section 3. The mode control section 23 is in charge of controlling over the line selection section 12 and the row selection section 13 through processing of the data stored in the memory 22 in accordance with a signal provided by the mode input section 21.

The line selection section 12 is a circuit that selects, based on a control signal coming from the mode control section 23, any one of a plurality of current-supply wiring traces for line selection use (will be described later) in the display-function-provided protrusion pattern forming section 3, and applies a drive signal thereto for sequential scanning in a time division manner. The row selection section 13 is a circuit that selects, also based on the control signal coming from the mode selection section 23, for application of a drive signal, any of a plurality of current-supply wiring traces for row selection use (will be described later) in the display-function-provided protrusion pattern forming section 3, and applies the drive signal thereto.

The display-function-provided protrusion pattern forming section 3 is configured by an elastic sheet 31, and an actuator 33. The actuator 33 forms a protrusion pattern based on a drive signal coming from each of the line selection section 12 and the row selection section 13. The elastic sheet 31 has a function of displaying a dot pattern based on the protrusion pattern formed by the actuator 33.

Exemplary Configuration of Display-Function-Provided Protrusion Pattern Forming Section 3

Figure 2:
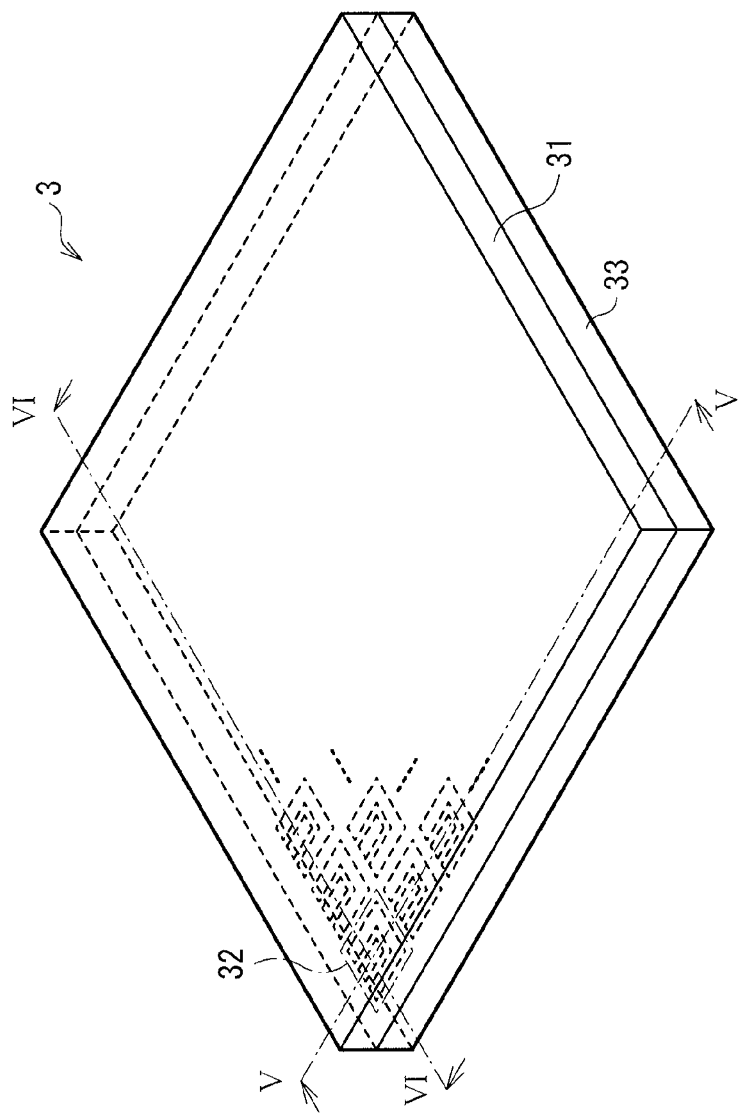
FIG. 2 is a perspective view of the protrusion pattern forming device with a display function of FIG. 1, showing one exemplary configuration thereof.

FIG. 2 is a perspective view of the display-function-provided protrusion pattern forming section 3, showing an exemplary configuration thereof. The display-function-provided protrusion pattern forming section 3 is configured by the elastic sheet, i.e., elastomer sheet, 31, and the actuator 33 in which a plurality of polymer actuator elements 32 are arranged in a matrix. The surface of the elastic sheet 31 serves as a protrusion pattern forming surface of the display-function-provided protrusion pattern forming section 3, and also as a dot pattern display surface thereof. The elastic sheet 31 is attached with the actuator 33 to overlap with each other, and such attachment may be made entirely or partially therebetween.

Figure 3A:
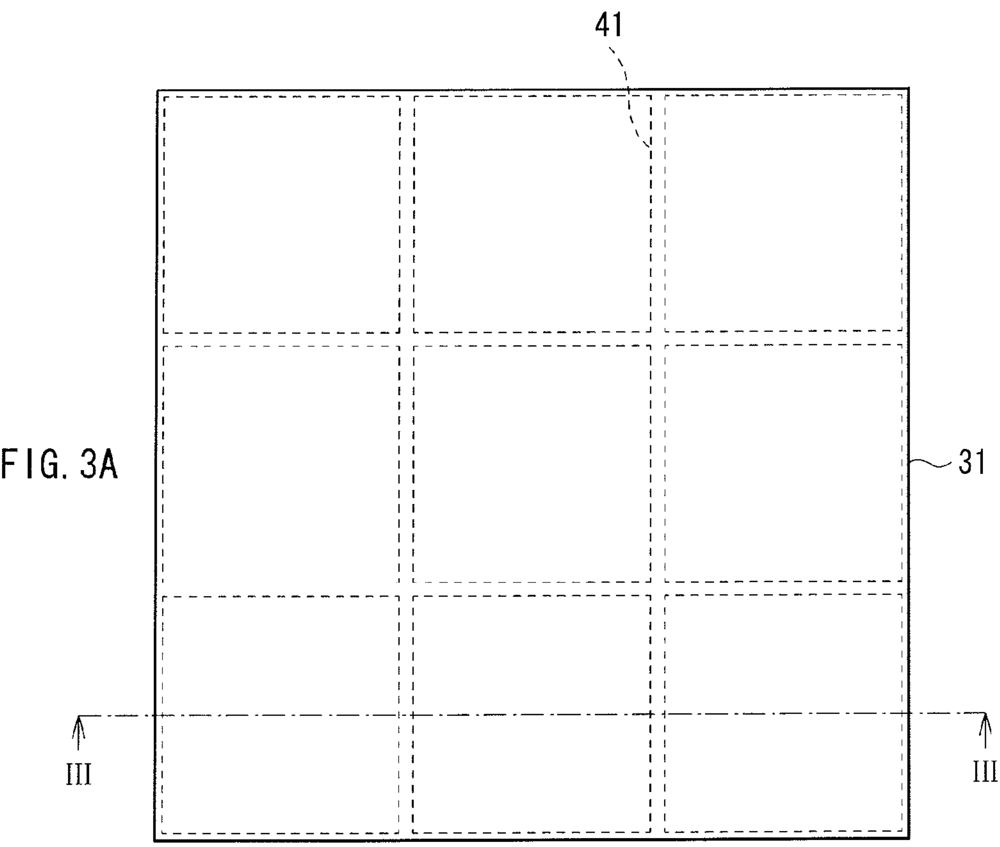
FIGS. 3A and 3B are respectively top and cross-sectional views of an elastic sheet of FIG. 2, showing one exemplary configuration thereof.
Figure 3B:
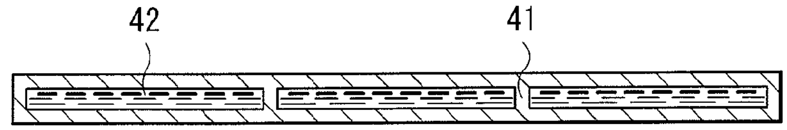

FIG. 3A is a plan view of the elastic sheet 31, and FIG. 3B shows the cross-sectional configuration of the elastic sheet 31 of FIG. 3A when it is viewed in the direction of an arrow III-III. The elastic sheet 31 is made of silicon rubber, and is transparent and extremely stretchy. Such an elastic sheet 31 is provided therein with an intermediate layer, and partition walls 41 that each serve to partition the intermediate layer into a plurality of areas. The partitioned areas of the intermediate layer partitioned by the partition walls 41 as such are each filled with a liquid 42 white in color. Herein, the white liquid 42 preferably has additional characteristics of nonvolatility, oil-based, low transparency, and others, and is exemplified by a liquid in which titanium oxide is dispersed in a silicon oil.

For manufacturing such an elastic sheet 31, such a white liquid is filled between two thermoplastic silicon rubber sheets, and the resulting structure is heated therearound together with portions serving as the partition walls, for example. Alternatively, a silicon rubber sheet formed with the partition walls 41 in advance may be also used.

Figure 4:
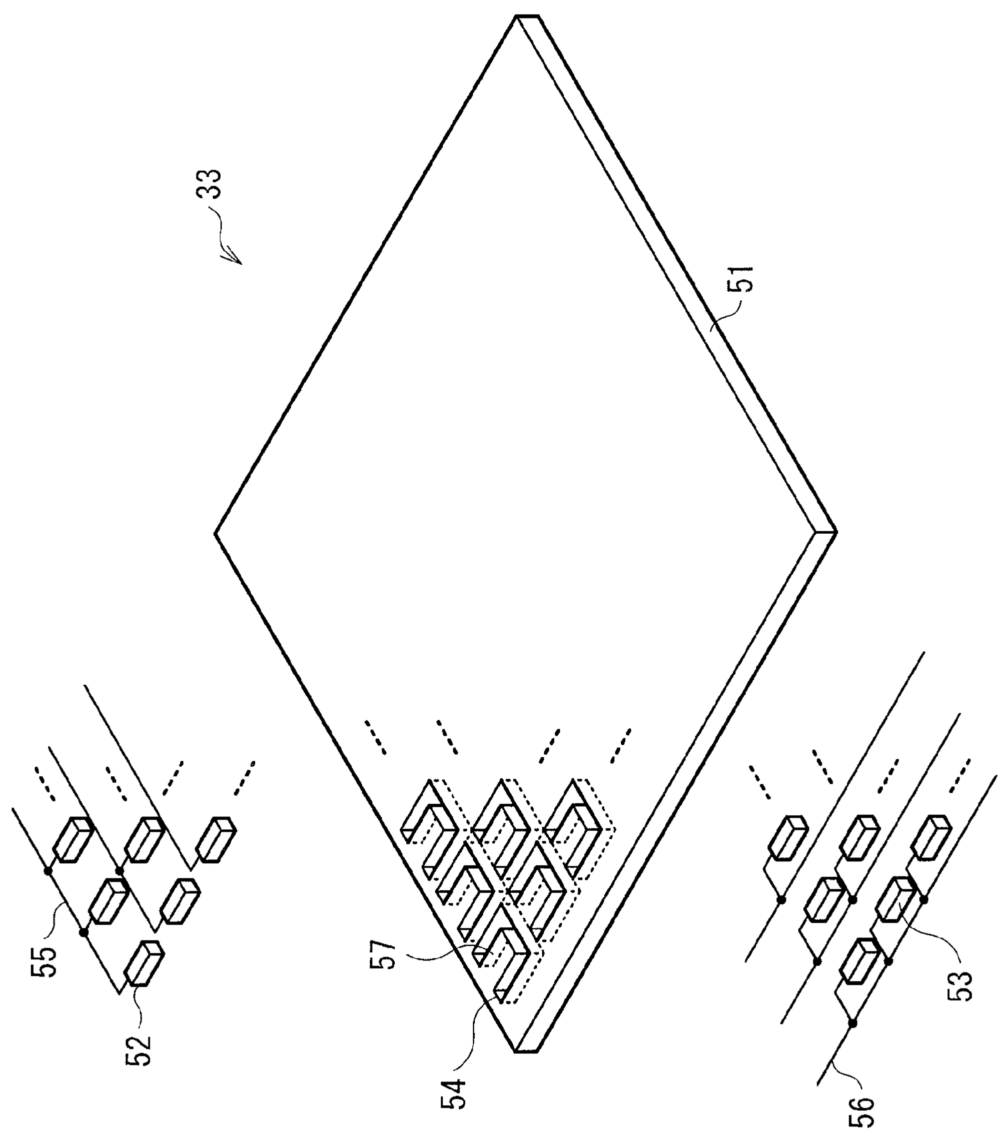
FIG. 4 is an exploded perspective view of an actuator of FIG. 2, showing one exemplary configuration thereof.

FIG. 4 is an exploded perspective view of the actuator 33, showing the configuration thereof. The actuator 33 is configured to include an ion conductive polymer film 51, drive electrodes 52 and 53, and current-supply wiring traces 55 and 56. The ion conductive polymer film 51 is deformed, i.e., curved in shape, in response to an application of a drive signal on its both surfaces in accordance with a potential difference therebetween (will be described later). The ion conductive polymer film 51 may be possibly made of Nafion™ (NRE-212), for example. The drive electrodes 52 are arranged in a matrix on the upper surface side of the ion conductive polymer film 51, and similarly, the drive electrodes 53 are arranged in a matrix on the lower surface side of the ion conductive polymer film 51. Such drive electrodes 52 and 53 configure a parallel plate with the ion conductive polymer film 51 sandwiched therebetween. These drive electrodes 52 and 53 each serve as an electrode for application of a drive signal to the ion conductive polymer film 51 on its both surfaces. The electrodes are each made of carbon powder and an ion conductive resin, and are each in the color of black. The current-supply wiring traces 55 have a one-to-one relationship with the rows of the matrix of the drive electrodes 52, and each make a current supply to the drive electrodes 52 of the corresponding row through application of a drive signal. Similarly, the current-supply wiring traces 56 have a one-to-one relationship with the lines of the matrix of the drive electrodes 53, and each make a current supply to the drive electrodes 53 of the corresponding line through application of a drive signal. Alternatively, on each of the surfaces of the drive electrodes 52 and 53, a metal layer may be formed for a connection with the corresponding current-supply wiring trace 55 or 56. If this is the configuration, the drive electrodes 52 are each preferably colored in black, for example.

The ion conductive polymer film 51 is formed with notches 54 in such a manner that the portions thereof sandwiched by the drive electrodes 52 and 53 are enclosed thereby on three sides, and the enclosed portions are cut out thereby. This is aimed to increase the curvature of the portions of the ion conductive polymer film 51 sandwiched by the drive electrodes 52 and 53 and enclosed by the notches 54, i.e., tongue-shaped actuation members 57.

The ion conductive polymer film 51 is made of a fluorocarbon resin or an ion exchange resin with the skeleton of hydrocarbon, for example. The ion exchange resin may be any of anion exchange resin, cation exchange resin, and cation-anion exchange resin, but the cation exchange resin is considered suitable. The cation exchange resin is exemplified by polyethylene, polystyrene, fluorocarbon resin, or others being introduced with a functional group of sulfonic acid, carboxyl, or others. Among these, especially preferable is the cation exchange resin as a result of a fluorocarbon resin being introduced with a functional group of sulfonic acid, carboxyl, or others.

In this example, the ion conductive polymer film 51 is at least impregnated with a cationic substance, and this cationic substance is preferably any of a liquid of water and metal ion, a liquid of water and organic ion, and an ionic liquid. The metal ion is exemplified by sodium ion, potassium ion, lithium ion, and magnesium ion. The organic ion is exemplified by alkyl ammonium ion. Such ion exists in a hydrated form in the ion conductive polymer film 51. When the ion conductive polymer film 51 is hydrous as is including a liquid of water and metal ion, or a liquid of water and organic ion, the actuator 33 is preferably sealed not to vaporize the water from inside.

The ionic liquid is a solvent made of only a non-flammable and non-volatile ion that is also called as room-temperature molten salt, and is exemplified for use by a cyclic compound of imidazolium, a cyclic compound of pyridinium, or an aliphatic compound. When the ion conductive polymer film 51 is impregnated with an ionic liquid, there is no need to concern about vaporization, and thus the actuator 33 may be used under high temperature conditions or in a vacuum.

The drive electrodes 52 and 53 are each made of carbon powder and an ion conductive resin, and therein, the ion conductive resin works for bonding of the carbon powder. The carbon powder is finely grained carbon black powder having conductivity, and the larger specific surface thereof leads to the larger surface area of the resulting drive electrodes 52 and 53 that comes in contact with the ion conductive polymer film 51 so that the resulting amount of deformation is to be large. Such carbon powder is preferably Ketjen Black™. The ion conductive resin may be made of the material same as that of the ion conductive polymer film 51.

Such an actuator 33 may be manufactured in the following procedure, for example. First of all, the carbon powder, e.g., Ketjen Black™, is blended with the ion conductive resin, e.g., Nafion™, at a ratio of 1:1. The resulting blend is then diluted by a solvent such as ethanol to have the solid content of 5%, for example. The diluted result is then dispersed using a disperser, thereby obtaining a coating material for the drive electrodes 52 and 53. This coating material is then used to coat, discretely in a matrix form, the ion conductive polymer film 51 prepared in advance, e.g., Nafion™ (NRE-212), on both surfaces thereof using a spray coating device or others so that a film is formed thereon. The resulting film is then impregnated with an ionic liquid, and then the notches 54 are formed thereto. Lastly, the current-supply wiring traces 55 and 56 are formed.

Figure 5:
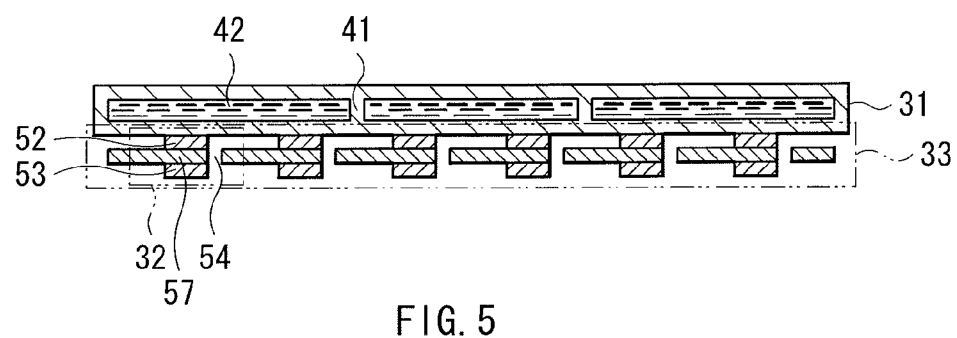
FIG. 5 is a cross-sectional view of a display-function-provided protrusion pattern forming section of FIG. 2, showing the schematic cross-sectional configuration thereof when it is viewed in the direction of an arrow V-V.
Figure 6:
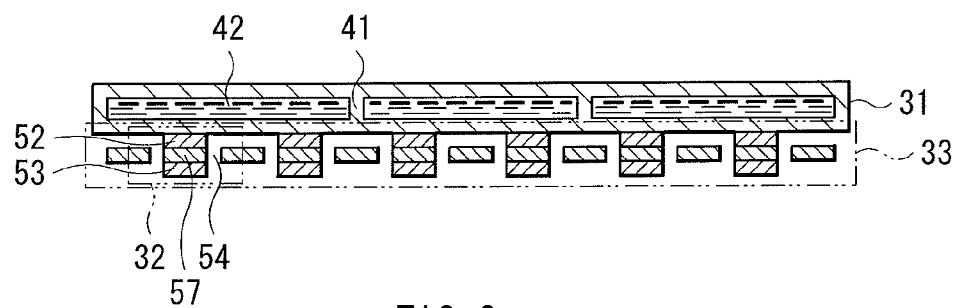
FIG. 6 is a cross-sectional view of the display-function-provided protrusion pattern forming section of FIG. 2, showing the schematic cross-sectional configuration thereof when it is viewed in the direction of an arrow VI-VI.

FIG. 5 is a cross-sectional view of the display-function-provided protrusion pattern forming section 3 of FIG. 2, showing the schematic cross-sectional configuration thereof when it is viewed in the direction of an arrow V-V, and FIG. 6 is another cross-sectional view of the display-function-provided protrusion pattern forming section 3 of FIG. 2, showing the schematic cross-sectional configuration thereof when it is viewed in the direction of an arrow VI-VI. The actuation member 57 is a configuration component of each of the polymer actuator elements 32 together with the drive electrodes 52 and 53.

The polymer actuator elements 32 are each disposed not to overlap with any of the partition walls 41 of the elastic sheet 31. This is because, for display of dots, the polymer actuator elements 32 each need thereon an intermediate layer filled with the white liquid 42 as will be described later.

Also in the configuration, the elastic sheet 31 is attached to the actuator 33 in such a manner as to overlap with each other. With such an attachment, as will be described later, when any of the polymer actuator elements 32 disposed on the surface of the actuator 33 is curved in shape, the change of the shape is to be directly transmitted to the elastic sheet 31.

Operation and Effects

Entire Basic Operation

Described first is the entire operation of the protrusion pattern forming device with a display function 1 of this embodiment.

The mode input section 21 receives a display mode selection signal coming from the outside. The mode control section 23 reads data of a frame stored in the memory 22, and processes the data based on the signal coming from the mode input section 21. To be more specific, in the high-resolution display mode, the mode control section 23 uses the data of a frame itself stored in the memory 22 to generate a signal for control over the line and row selection sections 12 and 13. On the other hand, in the low-resolution display mode, the control section 23 selects some of the data of a frame stored in the memory 22, and using the selected data, generates a signal for control over the line and row selection sections 12 and 13. The line selection section 12 uses the control signal coming from the mode control section 23 as a basis to select any one of a plurality of current-supply wiring traces 56 of the display-function-provided protrusion pattern forming section 3, and then applies a drive signal thereto for sequential scanning in a time division manner. The row selection section 13 also uses the control signal coming from the mode selection section 23 as a basis to select any of a plurality of current-supply wiring traces 55 of the display-function-provided protrusion pattern forming section 3 for application of a drive signal, and then applies the drive signal thereto. Based on the drive signals provided by the line and row selection sections 12 and 13 as such, the display-function-provided protrusion pattern forming section 3 forms a protrusion pattern at the same time as displaying a dot pattern synchronized with the protrusion pattern.

Exemplary Operation of Polymer Actuator Element 32

Described next are the operation principles of the polymer actuator element 32.

Figure 7A:
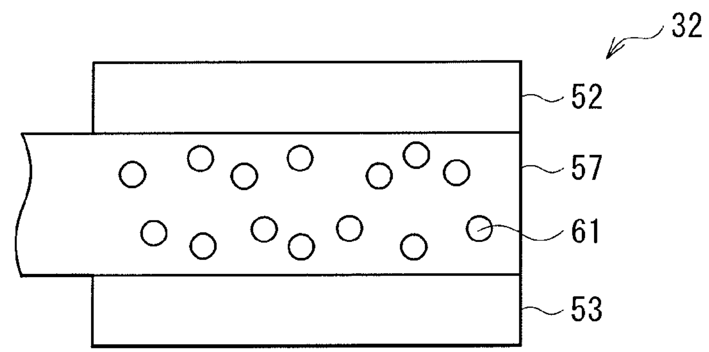
FIGS. 7A to 7C are schematic views of a polymer actuator element of FIG. 5 showing the operation principles thereof, and specifically
Figure 7B:
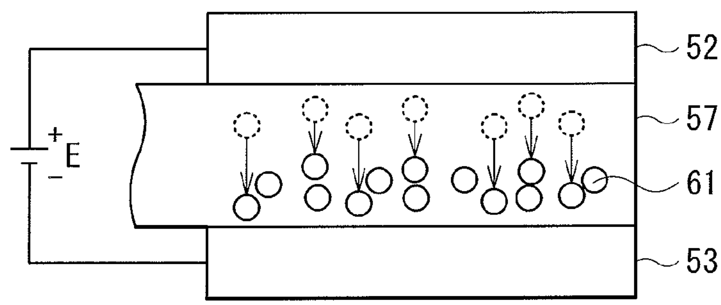
Figure 7C:
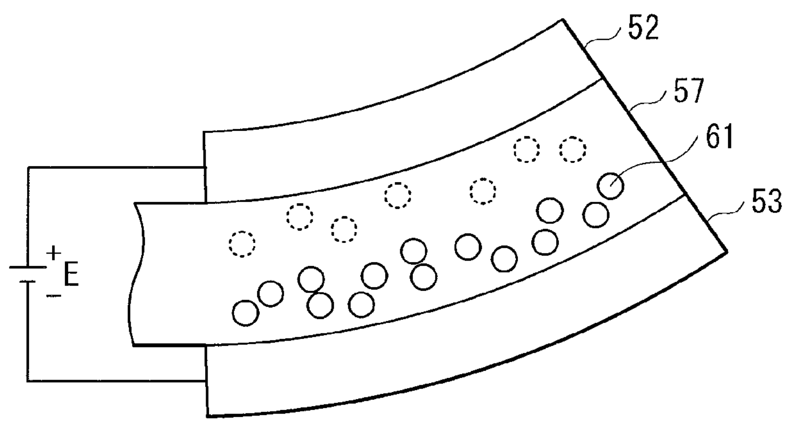

FIGS. 7A to 7C all show the operation of the polymer actuator element 32, and specifically FIG. 7A shows the state thereof with no application of a drive signal, FIG. 7B shows the state thereof in which ions are moving with an application of a drive signal, and FIG. 7C shows the state thereof after the movement of the ions as a result of the application of a drive signal. In this example, a description is given on the assumption that the ion conductive polymer film 51 is impregnated with sodium ion as a cationic substance.

In the state with no application of a drive signal to the drive electrodes 52 and 53, as shown in FIG. 7A, there is no potential difference between the surfaces thereof, and thus a sodium ion 61 exits uniformly inside of the actuation member 57 of the ion conductive polymer film 51.

On the other hand, with an application of a drive signal to the drive electrodes 52 and 53, as shown in FIG. 7B, due to the potential difference between the surfaces thereof, the sodium ion 61 inside of the actuation member 57 starts moving toward either of the drive electrodes being at a lower potential due to the pull thereof. In FIG. 7B example, a drive signal is so applied as to reduce the voltage of the drive electrode 53 to be lower than that of the drive electrode 52, and thus the sodium ion 61 is moved toward the drive electrode 53 due to the pull thereof. As a result of such a movement of the sodium ion, as shown in FIG. 7C, the concentration of the sodium ion is increased in an area in the vicinity of the drive electrode 53 inside of the actuation member 57, thereby increasing the volume of the area. On the other hand, in an area in the vicinity of the drive electrode 52, the concentration of the sodium ion is decreased, thereby decreasing the volume of the area. As a result of such volume increase and decrease, in the actuation member 57, a difference of volume is observed between these areas in the vicinity of the drive electrodes 52 and 53 so that the actuation member 57 is curved in shape in the direction of the drive electrode 52.

Exemplary Operation of Display-Function-Provided Protrusion Pattern Forming Section 3

Described next are the operation and effects of the display-function-provided protrusion pattern forming section 3. First of all, described are the operation and effects of one display element of the display-function-provided protrusion pattern forming section 3. Herein, the display element denotes a minimum-sized element configuring a protrusion pattern and a dot pattern to be displayed on the display-function-provided protrusion pattern forming section 3, and corresponds to a pixel in a display device such as liquid crystal display.

Figure 8A:
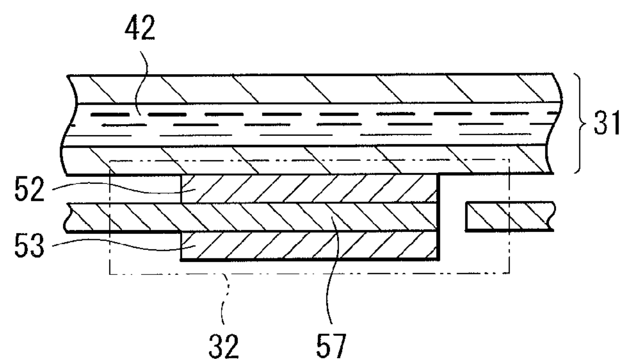
FIGS. 8A and 8B are cross-sectional views of one display element of the display-function-provided protrusion pattern forming section of FIG. 5 showing an exemplary modified operation thereof, and specifically
Figure 8B:
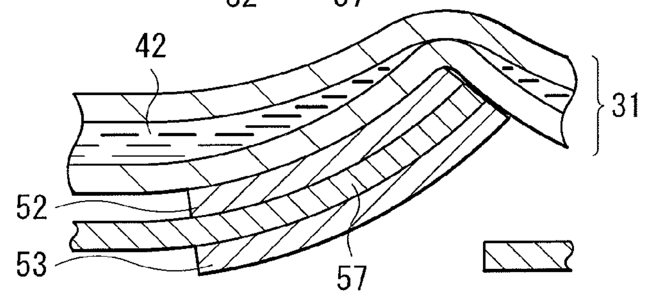

FIGS. 8A and 8B are cross-sectional views of one display element of the display-function-provided protrusion pattern forming section 3 of showing the cross-sectional configuration thereof, and specifically FIG. 8A shows the state thereof with no application of a drive signal, and FIG. 8B shows the state thereof with an application of a drive signal.

In the state with no application of a drive signal to the drive electrodes 52 and 53, as shown in FIG. 8A, the polymer actuator element 32 is not deformed and remains flat because there is no potential difference between the surfaces thereof. In this state, the elastic sheet 31 also remains flat on the surface.

Because the elastic sheet 31 is not under the force from the polymer actuator element 32, the intermediate layer thereof carries the filled white liquid 42 uniformly. In such a state, when the elastic sheet 31 is viewed from the upper surface side thereof, the white liquid 42 uniformly filled in the intermediate layer of the elastic sheet 31 is visible through the upper surface of the elastic sheet 31. That is, the sheet remains in the color of white.

On the other hand, in the state with an application of a drive signal to the drive electrodes 52 and 53, as shown in FIG. 8B, the polymer actuator element 32 related to the display element is deformed, i.e., curved in shape, in accordance with a potential difference between the drive signals. The drive electrode 52 is at a higher potential than the drive electrode 53, and thus the polymer actuator element 32 is deformed to curve in the direction of the drive electrode 52 being at a higher potential. As shown in FIG. 4, in the actuation member 57, the notch 54 separates the polymer actuator element 32 from the ion conductive polymer film on three sides. With such a configuration, the actuation member 57 is greatly curved in shape and protruded while being supported at a portion on the remaining one side not separated from the ion conductive polymer film 51, and thus the elastic sheet 31 is able to be pushed upward. As such, this display element is formed with a protrusion.

When pushing upward the elastic sheet 31, the polymer actuator 32 puts pressure to the intermediate layer, and thus the white liquid 42 in the intermediate layer is moved to be away from the pressured portion. As a result, through the elastic sheet 31 viewed from the upper side thereof, the protruded tip of the polymer actuator element 32 curved in shape becomes visible beneath the portion without the white liquid 42. Because the polymer actuator element 32 is formed thereon, i.e., on the upper side surface, with the drive electrode 52 in the color of black, this drive electrode 52 is visible from the outside. It means that a black dot is displayed on the display element.

As such, in the state with no application of a drive signal to the drive electrodes 52 and 53, a display element of the display-function-provided protrusion pattern forming section 3 remains flat and in the color of white. On the other hand, in the state with an application of a drive signal to the drive electrodes 52 and 53, a protrusion is formed, and in synchronization therewith, a black dot is displayed.

As is evident from such an exemplary operation, for display of dots, the polymer actuator elements 32 each need thereon the intermediate layer filled with the white liquid 42, and thus the polymer actuator elements 32 are necessary not to overlap with any of the partition walls 41 in the layout. These partition walls 41 are those especially in need when the elastic sheet 31 for use is large in size, for example. That is, when a large-sized elastic sheet is tilted, for example, the white liquid 42 is moved inside of the intermediate layer, thereby causing inconsistency in color density on the display surface, i.e., the elastic sheet 31. With the partition walls 41 formed, on the other hand, the display surface is partitioned thereby into small areas so that such inconsistency in color density may be favorably reduced in level.

As such, described is the function of one display element of the display-function-provided protrusion pattern forming section 3. When a plurality of display elements are individually functioned as described above in the display-function-provided protrusion pattern forming section 3, any two-dimensional information such as Braille characters, characters, and images is to be displayed in a protrusion pattern together with a dot pattern in synchronization therewith. Such an operation is described in detail below.

The line selection section 12 selects, based on a control signal coming from the mode control section 23, any one of a plurality of current-supply wiring traces 56 for line selection use in the display-function-provided protrusion pattern forming section 3, and applies a drive signal thereto. With such an operation, the drive signal is applied to the drive electrode 53 of all of the polymer actuator elements in the selected line.

Also based on the control signal coming from the mode control section 23, for application of a drive signal, the row selection section 13 selects any of a plurality of current-supply wiring traces 55 for row selection use in the display-function-provided protrusion pattern forming section 3, and applies the drive signal thereto. The number of the current-supply wiring traces 55 to be selected for application of a drive signal is not necessarily one but may be plural or none. With such an operation, the drive signal is applied to the drive electrode 52 of all of the polymer actuator elements in the selected row.

With an application of a drive signal to both of the drive electrodes 52 and 53, the polymer actuator element 32 is changed in shape to curve due to a potential difference therebetween, whereby the display element thereof is subjected to display. That is, among any display elements in the line selected by the line selection section 12, i.e., horizontal display element lines, any of those belonging to the row selected by the row selection section 13 is subjected to display. The display-function-provided protrusion pattern forming section 3 performs line-sequential scanning entirely thereover on the basis of the horizontal display element line, thereby displaying thereon information about one frame.

The actuator 33 in this example is driven in a so-called passive matrix mode. The mode inverse thereto is a so-called active matrix mode. In the active matrix mode, every display element necessitates a transistor, and also a circuit for driving of the transistor. On the other hand, the passive matrix mode does not necessitate such components so that the resulting system may be advantageously simplified in configuration.

Herein, in the display-function-provided protrusion pattern forming section 3, the actuator 33 serves as a device for forming a protrusion pattern, and the elastic sheet 31 serves as a device for displaying a dot pattern based on the protrusion pattern. This means operating the actuator 33 enables to form a protrusion pattern at the same time as displaying a dot pattern synchronized therewith. That is, because the means for forming a protrusion pattern is also in charge of displaying a dot pattern, the formation of a protrusion pattern may be performed in synchronization with the display of a dot pattern.

Exemplary Operation of Drive Control Section 11

Next, a detailed description is given about the operation and effects of the drive control section 11. The drive control section 11 is mainly in charge of processing data for display on the display-function-provided protrusion pattern forming section 3 in accordance with two display modes of high-resolution display and low-resolution display. In the high-resolution display mode, any information necessary for a high resolution is formed and displayed, e.g., characters and pictures, and in the low-resolution display mode, any information not necessary for a high resolution that much is formed and displayed, e.g., Braille characters and graphics.

Figure 9:
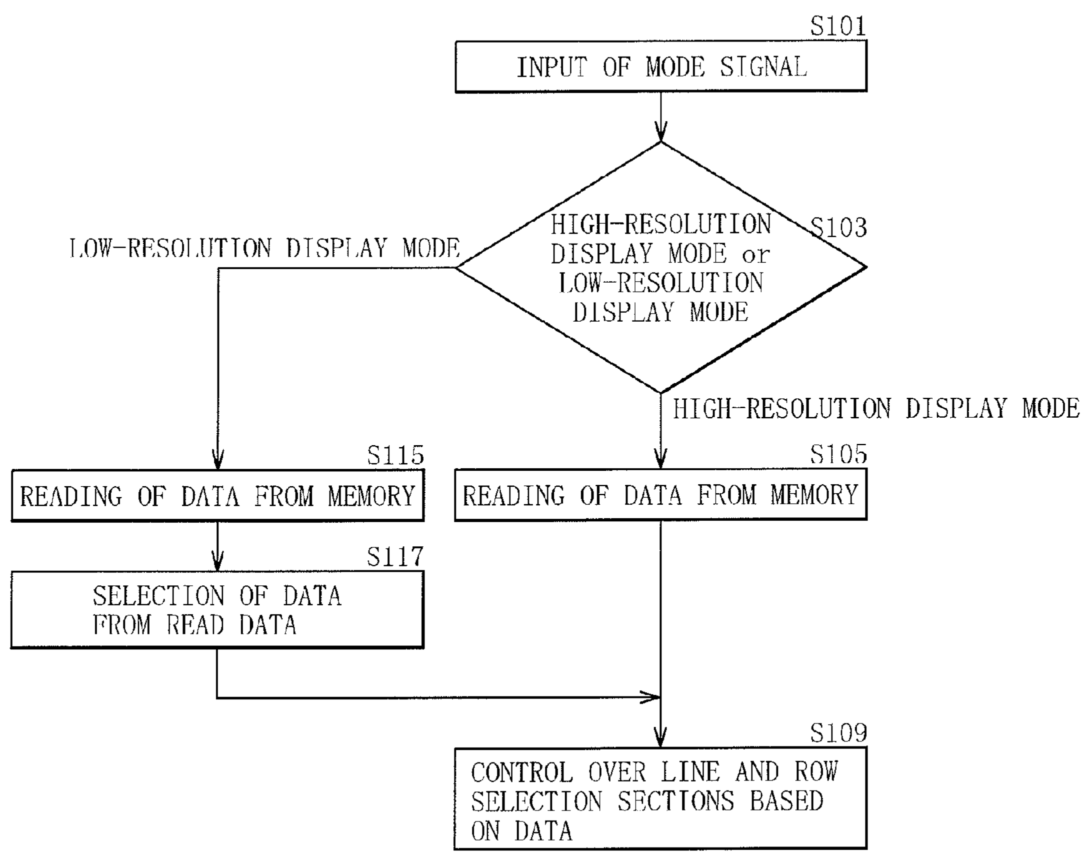
FIG. 9 is a flowchart of the operation of a drive control section of FIG. 1.

FIG. 9 is a flowchart of the operation of the drive control section 11.

In S101, information about a selection of two display modes is provided from the outside via the mode input section 21. Alternatively, such information may be provided by a user or from any other device.

Then in S103, the mode control section 23 takes a conditional branch in accordance with the display mode input in S101.

In the high-resolution display mode, in S105, the mode control section 23 performs data reading from the memory 22, and then in S109, controls the line and row selection sections 12 and 13 based on the data. In this case, the information to be eventually displayed on the display-function-provided protrusion pattern forming section 3 has a one-to-one relationship with the data stored in the memory 22. That is, the polymer actuator elements respectively related to the display elements of the display-function-provided protrusion pattern forming section 3 in its entirety are operated to deform corresponding to the data stored in the memory 22.

On the other hand, in the low-resolution display mode, in S115, after reading the data from the memory 22, the mode control section 23 processes the data by selection in S117. Alternatively, for such data processing, in the read data of a frame, any data about the uniformly-spaced display elements may be left out but the remaining data may be deleted. Thereafter, in S109, the processed data is used as a basis for control over the line and row selection sections 12 and 13. In this case, the information to be eventually displayed on the display-function-provided protrusion pattern forming section 3 does not have the one-to-one relationship any more with the data stored in the memory 22. That is, any of the polymer actuator elements related to the display element(s) whose data is deleted is not operated to deform but only any limited number of polymer actuator elements are operated to deform. As such, in the low-resolution display mode, the protrusion pattern may be reduced in protrusion density, and the dot pattern may be reduced in dot density.

Figure 10A:
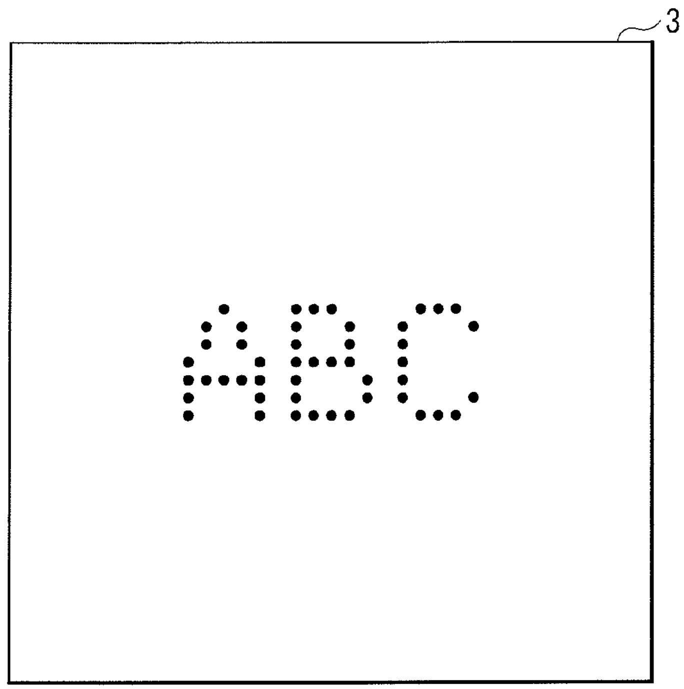
FIGS. 10A and 10B each show a display example of the protrusion pattern forming device with a display function of FIG. 1, and specifically FIG. 10A schematically shows a display in a high-resolution display mode, and FIG. 10B schematically shows a display in a low-resolution display mode.
Figure 10B:
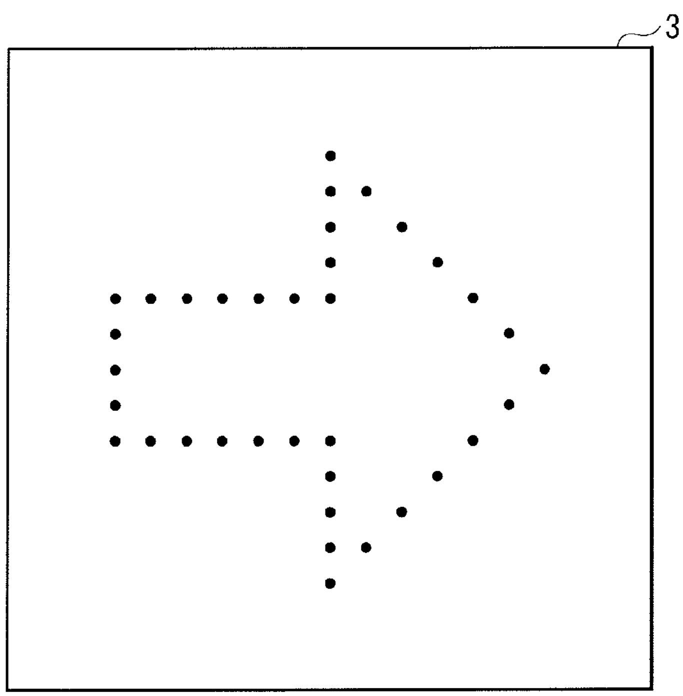

FIGS. 10A and 10B each show a display example in the protrusion pattern forming device with a display function 1, and specifically FIG. 10A shows a display example in the high-resolution display mode, and FIG. 10B shows a display example in the low-resolution display mode. The high-resolution display mode is suited for display necessitating a high resolution, e.g., characters and pictures, considering that every display element may be operated thereby. For a user to perceive any information displayed in the high-resolution display mode as a protrusion pattern using his or her finger(s), however, due to the limitations in terms of resolution of perception, and he or she thus may not fully understand the pattern. The low-resolution display mode is used in such a case, and is suitable for display of Braille characters and graphics, for example.

Effects

In such an embodiment as above, the actuator 33 is so disposed as to overlap with the elastic sheet 31 to come in contact therewith. Such a layout favorably enables to form a protrusion pattern at the same time as displaying a dot pattern in synchronization therewith, and also implements the reduction of size and weight. Moreover, because the actuator 33 is configured by a polymer actuator element, the resulting device may be thus reduced more in size and weight.

Described next are modified examples of the embodiment. In the below, any component same as that in the embodiment is provided with the same reference numeral, and is not described twice if appropriate.

Modified Example 1-1

Figure 11A:
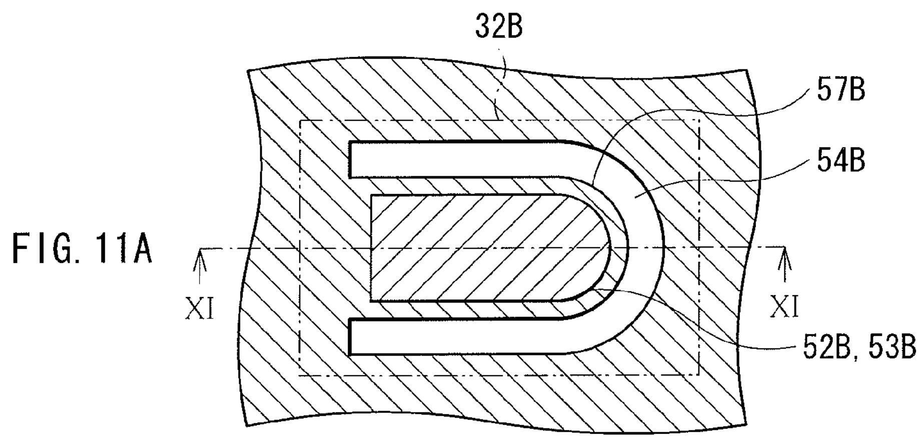
FIGS. 11A to 11C are diagrams showing one modified example of the first embodiment, and specifically
Figure 11B:
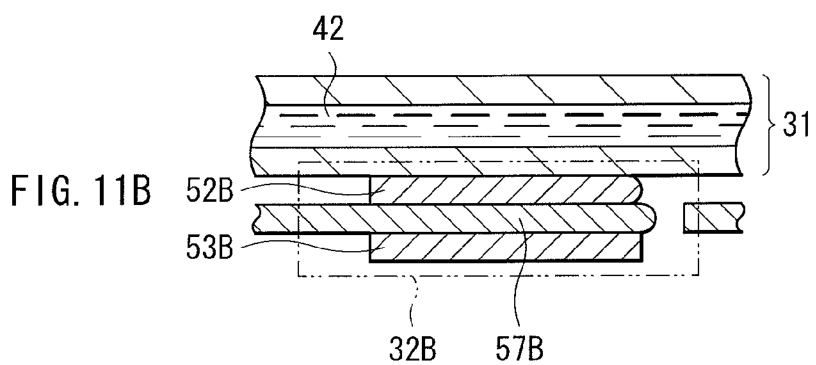
Figure 11C:
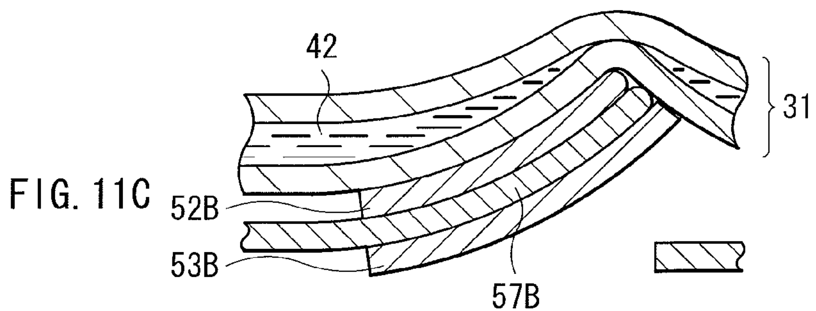

In the embodiment above, the notch 54 is exemplified as enclosing the polymer actuator element 32 by three straight lines on three sides as shown in FIG. 4, but this is surely not restrictive. Alternatively, as shown in FIG. 11A, a notch 54B may be so configured as to enclose the polymer actuator element 32 by a curved line and two straight lines on three sides. If this is the case, the electrodes may be also changed in shape. FIGS. 11B and 11C are each a view of a polymer actuator element 32B of FIG. 11A, showing the cross-sectional configuration thereof when it is viewed in the direction of an arrow XI-XI. Specifically, FIG. 11B shows the cross-sectional configuration thereof in the state with no application of a drive voltage between a drive electrode 52B (upper surface side) and a drive electrode 53B (lower surface side), and FIG. 11C shows the cross-sectional configuration in the state with an application of a drive voltage therebetween. As shown in FIGS. 11B and 11C, the tip end portion of the polymer actuator element 32B is three-dimensionally curved. With an application of a drive voltage to the drive electrodes 52B and 53B, as shown in FIG. 11C, the polymer actuator element 32B pushes upward the elastic sheet 31 by the curved surface thereof. Accordingly, when the elastic sheet 31 is viewed from the upper surface side thereof, a protrusion to be formed by this display element, and a dot to be displayed thereby will both look more circular than those in the first embodiment described above.

Modified Example 1-2

Figure 12A:
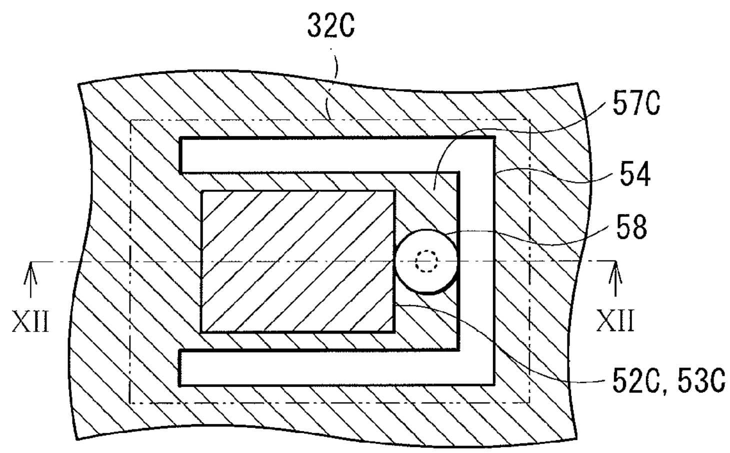
FIGS. 12A to 12C are diagrams showing another modified example of the first embodiment, and specifically
Figure 12B:
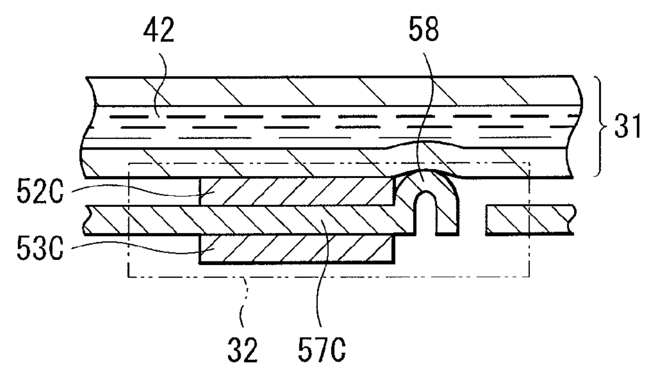
Figure 12C:
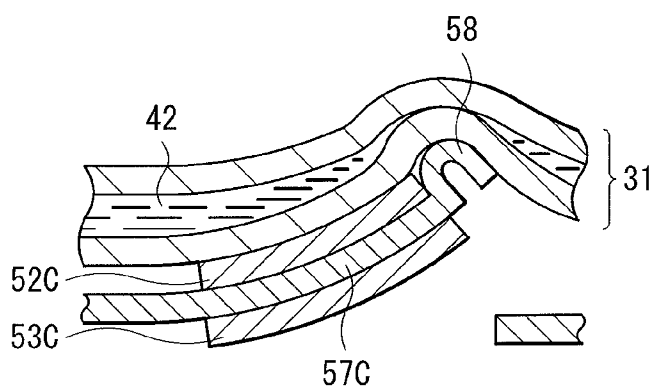

In the first embodiment described above, exemplified is the case that, when being curved in shape for pushing upward the elastic sheet 31, the polymer actuator element 32 pushes the sheet by the plane of the drive electrode 52, but this is surely not restrictive. Alternatively, as shown in FIG. 12A, an actuator element 32C may be formed with a hemispherical ball 58 by stamping at the tip end portion of an actuation member 57C therein, and by the spherical surface of the ball 58, the elastic sheet 31 may be pushed upward, for example. The surface of the ball is not necessarily be hemispherical as shown in the drawing, and may be spheroidical. FIGS. 12B and 12C are diagrams each showing the cross-sectional configuration of a polymer actuator element 32C of FIG. 12A when it is viewed in the direction of an arrow XII-XII. Specifically, FIG. 12B shows a cross-sectional configuration of the polymer actuator element 32C in the state with no application of a drive signal to the drive electrodes 52 and 53, and FIG. 12C shows a cross-sectional configuration thereof in the state with an application of a drive signal to the drive electrodes 52 and 53. With an application of a drive voltage to the drive electrodes 52 and 53, as shown in FIG. 12C, the polymer actuator element 32C responsively pushes upward the elastic sheet 31 by the large spherical surface of the ball 58. Accordingly, when the elastic sheet 31 is viewed from the upper surface side thereof, a protrusion to be formed by this display element, and a dot to be displayed thereby both look much more circular than those in the modified example 1-1.

Modified Example 1-3

In the first embodiment described above, the drive electrodes 52 are exemplified as in the color of black, but may be in any other colors. Alternatively, the ball 58 in the modified example 1-2 may be colored. By using a polymer actuator element colored as such, the display element thereof becomes able to display a dot pattern in color so that the resulting display may be made with better flexibility. The color is not restrictive, but is preferable if the hue and lightness thereof are different from those of the color of the white liquid 42.

Modified Example 1-4

Figure 13:
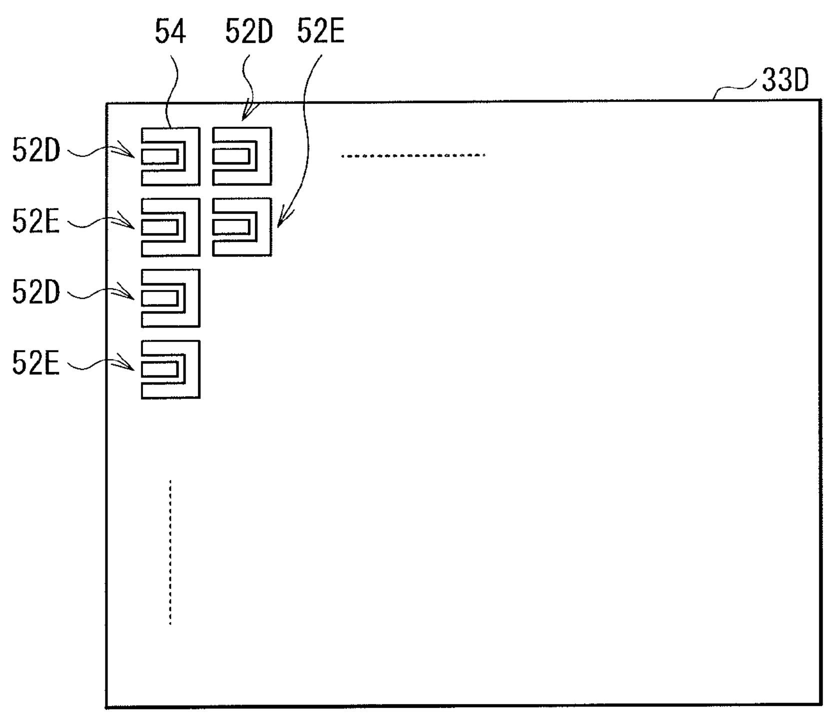
FIG. 13 is a top view of a protrusion pattern forming section in still another modified example of the first embodiment, showing one exemplary configuration thereof.

In the first embodiment described above, in the actuator 33, the polymer actuator elements 32 are exemplified as each including the drive electrode 52 in the color of black, but this is surely not restrictive. For example, as shown in FIG. 13, in an actuator 33D, the polymer actuator elements may be of various colors with colored drive electrodes therein, e.g., a drive electrode 52D and a blue drive electrode 53D. If this is the configuration, the resulting dot pattern may be of various colors so that the display may be made with much better flexibility.

Other Modified Examples

In the first embodiment described above, exemplified is the configuration in which the current-supply wiring traces 55 on the upper surface side of the actuator 33 are connected to the row selection section 13, and the current-supply wiring traces 56 on the lower surface side thereof are connected to the line selection section 12. Alternatively, the current-supply wiring traces 55 on the upper surface side of the actuator 33 may be connected to the line selection section 12, and the current-supply wiring traces 56 on the lower surface side thereof may be connected to the row selection section 13.

In the first embodiment described above, exemplified is the case that the drive electrodes 52 and 53 are each made of carbon powder and an ion conductive resin. This is surely not restrictive, and the material may be metal, for example.

2. Second Embodiment

Described next is a protrusion pattern forming device with a display function in a second embodiment of the invention. In this second embodiment, a polymer actuator element in use is different from the one in the first embodiment. That is, in the first embodiment (FIGS. 8A and 8B), the polymer actuator element 32 is configured using the ion conductive polymer film 51, but alternatively, in this embodiment, a polymer actuator element is configured using a three-dimensional (3D) cross-linked polymer. The remaining configuration is the same as that in the first embodiment (FIG. 1).

Figure 14A:
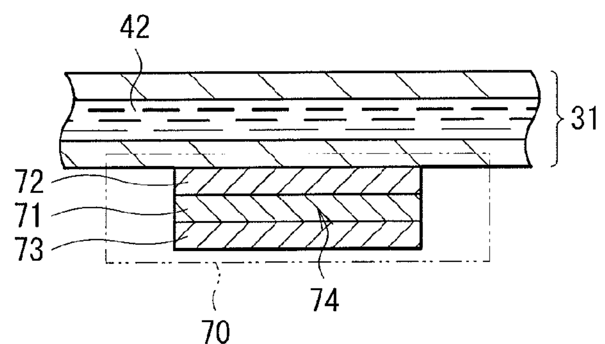
FIGS. 14A and 14B are cross-sectional views of a main portion (display-function-provided protrusion pattern forming section) in a protrusion pattern forming device with a display function in a second embodiment of the invention, and specifically

FIG. 14A shows an exemplary cross-sectional configuration of one display element of a display-function-provided protrusion pattern forming section 7. This display element is configured to include a polymer actuator element 70 and the elastic sheet 31. The polymer actuator element 70 is configured to include a 3D cross-linked polymer 71, a pair of drive electrodes 72 and 73, and an electrolytic solution 74. The pair of drive electrodes 72 and 73 are so disposed as to oppose each other with a space therebetween on the both sides of the 3D cross-linked polymer 71. The 3D cross-linked polymer 71 is impregnated with the electrolytic solution 74. Herein, such electrodes 72 and 73 may be provided therebetween with a separator made of polyvinylidene fluoride, polyethylene, polyvinyl alcohol, styrene-butadiene copolymer, polystyrene, polypropylene, and others.

The 3D cross-linked polymer 71 is made of a three-dimensionally cross-linked polymeric material, and has a film-like shape with a pair of main surfaces on both sides, for example. Note that the 3D cross-linked polymer 71 is not necessarily like a film, and may be also like a strip, disk, rod (prism, cylindrical, or tubular), and others.

The polymeric material is prepared by copolymerization of a first site A with a second site B as shown in the following chemical formula, for example, i.e., copolymerization like random copolymers, alternating copolymers, or block copolymers. The first site A undergoes an oxidation-reduction reaction electrochemically reversible, i.e., a component in which the ion valence shows an electric reversible change. The second site B is electrically stable and flexible in the range of potential for use, i.e., a portion in which the ion valence shows no change.

Chemical Formula 1

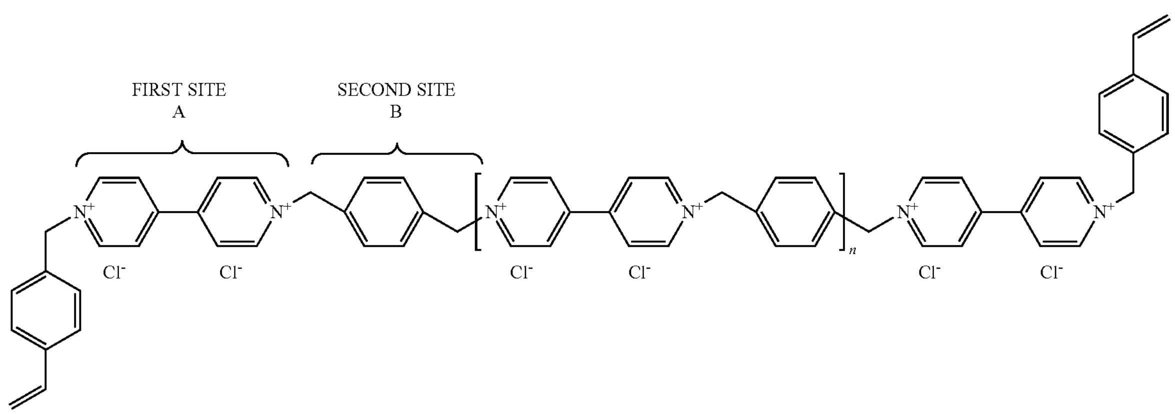

In the 3D cross-linked polymer 71, the first site A includes a compound having the quinone skeleton, a metal complex of Os (osmium), Ru (ruthenium), Fe (iron), or Co (cobalt), a bipyridinium compound such as dimethyl bipyridinium, a compound in the structure of nicotinamide, a compound in the structure of riboflavin, or a compound in the structure of nucleotide phosphoric acid, for example. In the first site A, such compounds are three-dimensionally cross-linked.

The second site B includes one or more of alkyl, ether, carbonyl, ester, aldehyde, ketone, amido, and amine. Such a second site B has a more flexible structure than a π-conjugated conductive polymer in the continuous structure. As such, in the second embodiment, the first site A undergoing the oxidation-reduction reaction is more flexible, and as a result, the first site A behaves like a mediator. This accordingly allows the electron transfer to any site, i.e., first site, away from the electrodes in the 3D cross-linked polymer, thereby enabling a large amount of displacement and a high-speed response.

The drive electrodes 72 and 73 are each made of a material with high electrical conduction and good flexibility. Such a material includes Au (gold), Pt (platinum), carbon black, Ketjen Black, carbon nanotube, fullerene, polyacethylene, polypyrrole, polythiophene, poly-1,6-heptadiyne, poly-p-phenylene, and polyphenylenevinylene, for example, and may be made of a compound including any of such materials.

The drive electrodes 72 and 73 are each formed like a film, for example, and are each provided in the longitudinal direction of the 3D cross-linked polymer 71 entirely therealong, for example. Alternatively, the drive electrodes 72 and 73 may be each provided in the longitudinal direction of the 3D cross-linked polymer 71 not entirely but partially therealong, but in view of achieving a large amount of displacement, the entire provision is considered preferable. The drive electrodes 72 and 73 are not necessarily shaped like a film, and may be also shaped like a coil, a particle, a filler, and a porous element, for example. The drive electrodes 72 are each preferably coated in black on the surfaces, for example.

The electrolytic solution 74 is made of a mixture including a solvent sufficient for a polymeric material to get wet and swell and a supporting salt, or is made only of a supporting salt, but this is surely not restrictive. In a case with an element to be displaced, i.e., curved in shape, like the polymer actuator element 70 (FIGS. 14A and 14B) of this second embodiment, the electrolytic solution 74 for use is preferably made of a material that causes no redox reaction (oxidation-reduction reaction) in a potential window of the solvent, i.e., in an area at a potential allowing a beneficial electrochemical measurement. On the other hand, in a case with an element which deforms in a longitudinal direction like a polymer actuator element 80 that will be described later (FIGS. 15A and 15B), the electrolytic solution for use is preferably made of a salt that causes a reversible redox reaction (oxidation-reduction reaction) in the potential window of the solvent.

The electrolytic solution 74 is exemplified by cyclic carbonates such as propylene carbonate (PC), ethylene carbonate (EC), butylene carbonate (BC), and vinylene carbonate (VC), chain carbonates such as dimethyl carbonate (DMC), diethyl carbonate (DEC), ethyl methyl carbonate (EMC), and dipropyl carbonate (DPC), aliphatic carboxylic acid esters such as methyl formate, methyl acetate, and ethyl propionate, γ-lactones such as γ-butyrolactones, chain ethers such as 1,2-diethoxyethane (DEE), and ethoxymethoxyethane (EME), cyclic ethers such as tetrahydrofuran, and 2-methyltetrahydrofuran, a non-protic organic solvent including dimethyl sulfoxide, 1,3-dioxolane, formamide, acetamide, dimethylformamide, dioxolane, acetonitrile (AN), propylnitrile, nitromethane, ethyl monoglyme, phosphoric trimester, trimethoxymethane, dioxolane derivative, sulfolane, methylsulfolane, 1,3-dimethyl-2-imidazolidinone, 3-methyl-2-oxazolidinone, propylene carbonate derivative, tetrahydrofuran derivative, ethyl ether, 1,3-propane sultone, anisole, N-methylpyrrolidone, and fluorocarboxylic ester, or a mixture of water, an ionic liquid, and ammonium perchlorate, tetraalkylammonium salt, a compound having the quinone skeleton, a metal complex of Os (osmium), Ru (ruthenium), Fe (iron) or Co (cobalt), a bipyridinium compound such as dimethyl bipyridinium, a compound in the structure of nicotinamide, a compound in the structure of riboflavin, and a compound in the structure of nucleotide phosphoric acid. Note that such examples as above are surely not restrictive.

Operation and Effects

Exemplary Operation of Polymer Actuator Element 70

Figure 14B:
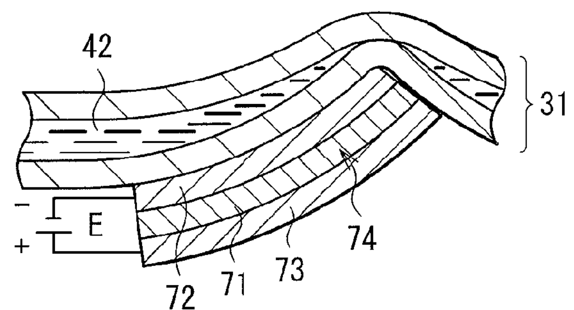

FIG. 14B shows the polymer actuator element 70 being curved in shape as a result of an application of a voltage of a predetermined level by a power source E to the drive electrodes 72 and 73.

On the drive electrode 73 side with an application of a positive (+) potential, the first site A in the 3D cross-linked polymer 71 undergoes oxidation, and thus the affinity with the electrolytic solution 74 shows a change. That is, the affinity between the first site A in the 3D cross-linked polymer and the electrolytic solution 74 is increased, and the 3D cross-linked polymer 71 thus swells due to the impregnation of the electrolytic solution 74 thereinto.

On the other hand, on the drive electrode 72 side with an application of a negative (−) potential, a reaction to be observed thereon is opposite to that on the drive electrode 73 side. That is, the first site A on the drive electrode 72 side undergoes reduction, and thus the affinity with the electrolytic solution 74 is reduced. As a result, the 3D cross-linked polymer shrinks due to the drain of the electrolytic solution 74 therefrom.

As such, the 3D cross-linked polymer 71 swells on the drive electrode 73 side but shrinks on the drive electrode 72 side, whereby the polymer actuator element 70 is largely curved in shape in its entirety. If the electrodes 72 and 73 are short-circuited for discharge thereafter, the swollen and shrunk portions as above are returned to the original shape so that the polymer actuator element 70 returns to flat and straight state (FIG. 14A).

As such, the polymer actuator element 70 in this embodiment may favorably lead to a large amount and force of displacement, and the reason is now described in more detail. That is, for making the first site A undergo the oxidation-reduction reaction in the 3D cross-linked polymer 71 by an application of a voltage, a need arises for electron exchange between the drive electrodes 72 and 73 and the 3D cross-linked polymer 71. Moreover, for achieving such oxidation-reduction reaction with a good efficiency at a high speed, in addition to the electron exchange as such with the drive electrodes 72 and 73, another needs arises for smooth transport of electrons in the internal area of the 3D cross-linked polymer 71.

The concern here is that the smooth transport of electrons is difficult because the first site A in the 3D cross-linked polymer 71 is three-dimensionally cross linked, and the chemical structure thereof is fixed. For achieving the smooth transport of electrons as such, and for making the first site A to undergo the oxidation-reduction reaction, the first site A needs to satisfy one of the following conditions. That is, the conditions are those whether the first site A is entirely in contact with the drive electrodes, whether it is disposed in an electric double layer that is formed in the vicinity of the electrodes, and whether it itself has the electron conductivity. However, the resulting first site A satisfying one of the conditions as such is not suitable for use as the actuator element.

In consideration thereof, in this embodiment, the 3D cross-linked polymer 71 is provided with the second site B being electrically stable in a range of potential for use. Because this second site B is partially flexible, the first site A ready for oxidation-reduction reaction may be increased in flexibility so that the first site A behaves like a mediator, i.e., medium for transfer of electrons. As a result, the transfer of electrons is smoothly carried out to the first site A being away from the drive electrodes 72 and 73, i.e., the transport of electrons is smoothly carried out to the internal area side of the 3D cross-linked polymer 71. This accordingly leads to the oxidation-reduction reaction of the first site A with a good efficiency at a high speed, thereby being able to achieve a large amount and force of displacement. Moreover, the 3D cross-linked polymer has a more flexible structure than a π-conjugated conductive polymer in the continuous structure, and thus serves well as an actuator element leading to a large amount of displacement and a high-speed response.

Note that, in this second embodiment, the electrolytic solution 74 for use is preferably made of a material that causes no redox reaction (oxidation-reduction reaction) in a potential window of the solvent, i.e., in an area at a potential allowing a beneficial electrochemical measurement. With the electrolytic solution causing no redox reaction as such, the oxidation-reduction reaction takes place on both the drive electrodes 72 side and the drive electrodes 73 side so that the polymer actuator element 70 of this embodiment may be largely curved in shape.

Exemplary Operation of Display-Function-Provided Projection Pattern Forming Section 7

In the display-function-provided protrusion pattern forming section 7 of this second embodiment, the actuator 33 in the first embodiment is replaced with an actuator 77, which is provided with the above-described polymer actuator elements 70 on the surface. Such an actuator 77 operates like the actuator 33 described in the first embodiment. That is, in the state with no application of a drive signal to the drive electrodes 72 and 73, as shown in FIG. 14A, the polymer actuator element 70 does not change in shape and remains flat due to no potential difference between the both surfaces thereof, and the elastic sheet 31 remains flat and in the color of white. On the other hand, in the state with an application of a drive signal to the drive electrodes 72 and 73, as shown in FIG. 14B, the polymer actuator element 70 is curved in shape in the direction of the drive electrode 72 being at a lower potential. By the polymer actuator element 70 curved as such pushing upward the elastic sheet 31, a protrusion is accordingly formed. At the same time, the white liquid 42 in the elastic sheet 31 is moved to be away from the portion pushed by the protrusion from below, and on the resulting portion without the white liquid 42, a dot is displayed in the color related to the color of the drive electrode 72, i.e., black in this example.

Moreover, when a plurality of display elements are individually functioned as described above in the display-function-provided protrusion pattern forming section 7, any two-dimensional information such as Braille characters, characters, and images is to be displayed in a protrusion pattern together with a dot pattern in synchronization therewith.

Effects

As such, in this second embodiment, with the 3D cross-linked polymer 71 provided with the second site B, the formation of a protrusion pattern may be implemented with clarity together with the display of a dot pattern thanks to a large amount of displacement and a high-speed response of the resulting actuator element. The remaining effects are the same as those achieved in the first embodiment described above.

3. Third Embodiment

Described next is a protrusion pattern forming device with a display function in a third embodiment of the invention. In this third embodiment, a polymer actuator element is different in type from those in the first and second embodiments. That is, as an alternative to the polymer actuator element 70 in the second embodiment (FIGS. 14A and 14B), i.e., the actuator element 70 made of a 3D cross-linked polymer to be curved in shape, exemplified in this third embodiment is a rod-like polymer actuator element 80 made of a 3D cross-linked polymer to be changed in length. Also in this third embodiment, unlike in the first and second embodiments, the polymer actuator element 80 is so oriented that the longitudinal direction thereof is orthogonal to the elastic sheet 31, and an end thereof in the longitudinal direction comes in contact with the surface of the elastic sheet 31. The remaining configuration is the same as that in the first embodiment (FIG. 1).

Exemplary Configuration of One Display Element of Display-Function-Provided Protrusion Pattern Forming Section 8

Figure 15B:
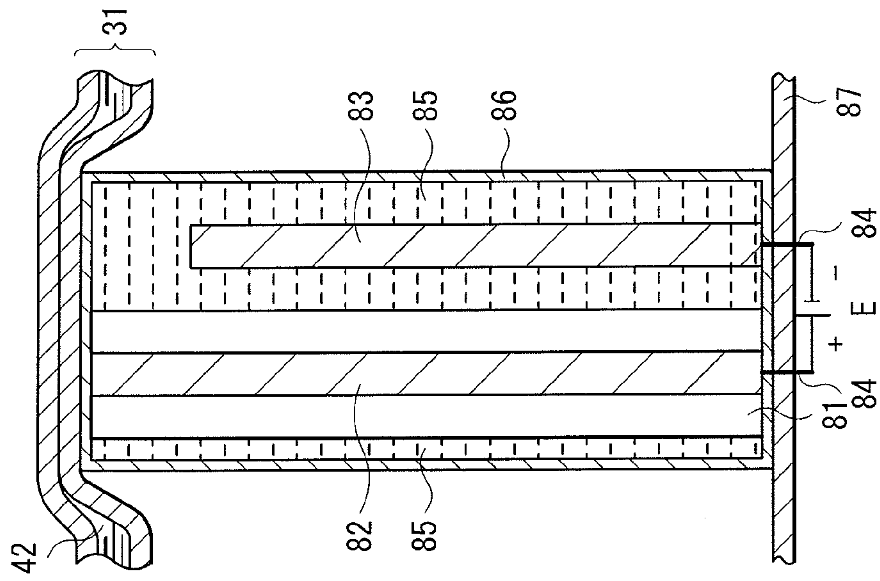
FIGS. 15A and 15B are cross-sectional views of a main portion (display-function-provided protrusion pattern forming section) in a protrusion pattern forming device with a display function in a third embodiment of the invention, and specifically
Figure 15A:
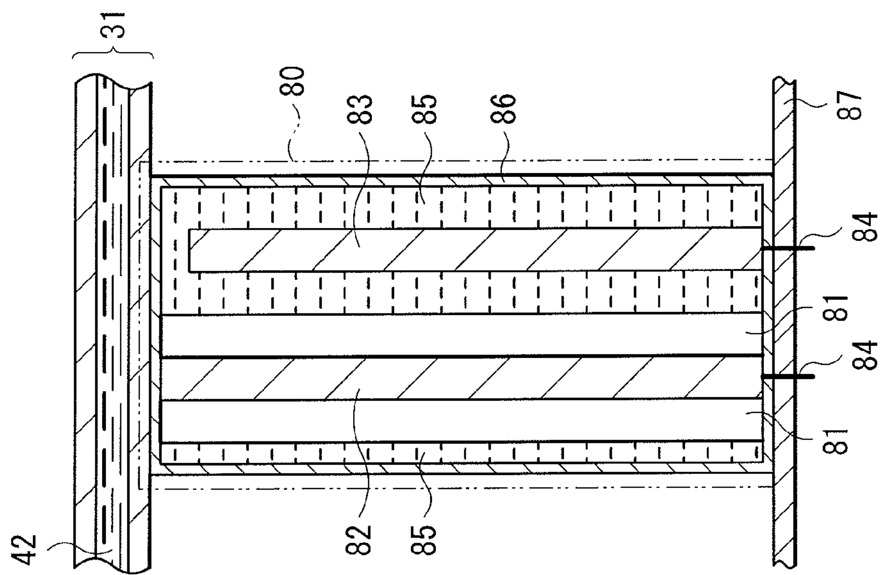

FIG. 15A shows an exemplary cross-sectional configuration of one display element of a display-function-provided protrusion pattern forming section 8. This one display element is configured by the polymer actuator element 80, and the elastic sheet 31. The polymer actuator element 80 is the one so configured as to be displaced in a linear direction, and includes a rod-like 3D cross-linked polymer 81 and rod-like drive electrodes 82 and 83 all housed in a container 86. The 3D cross-linked polymer 81 is impregnated with an electrolytic solution 85. Note that the polymer actuator elements 80 configuring an actuator 88 are all supported by a common substrate 87. In the state of non-actuation, i.e., in the state with no application of a voltage, one end side of each of the polymer actuator elements 80 in the longitudinal direction, i.e., one upper surface side of the container 86, is in contact with one surface of the elastic sheet 31.

The 3D cross-linked polymer 81 is made of a polymeric material similar to that of the 3D cross-linked polymer 71 in the second embodiment, and is in the three-dimensional shape with some degree of length. The upper and lower end portions of the 3D cross-linked polymer 81 are each in contact with the container 86, and any change of volume observed in this 3D cross-linked polymer 81 is transmitted as a displacement to the container 86 and to the outside thereof.

The drive electrodes 82 and 83 may be made of the same material as that of the drive electrodes 72 and 73 in the second embodiment, but are so aligned that their longitudinal direction matches the longitudinal direction of the 3D cross-linked polymer 81. One of the paired drive electrodes, i.e., drive electrode 82, has the same length as the 3D cross-linked polymer 81. The drive electrode 82 is positioned inside of or to be in contact with the 3D cross-linked polymer 81. The remaining drive electrode 83 is so disposed as to oppose the drive electrode 82 with the 3D cross-linked polymer 81 sandwiched therebetween, and as to be away from the 3D cross-linked polymer 81 via the electrolytic solution 85.

In this example, the drive electrode 82 is made of a flexible conductive material that is stretchable in accordance with the swelling and shrinking of the 3D cross-linked polymer 81. As to the drive electrode 83, when the both ends thereof are not connected to the container 86, or even if the ends thereof are connected thereto, as long as the elasticity of the drive electrode does not disturb the driving of the polymer actuator element 80, e.g., the drive electrode 83 is divided into a plurality of electrode segments, the conductive material configuring the drive electrode 83 is not necessarily with a flexibility.

The electrolytic solution 85 is stored in the container 86 at least by the amount to be carried in the 3D cross-linked polymer 81 at the time of maximum swelling of the polymer actuator 80. Accordingly, in the container 86, the 3D cross-linked polymer 81 and the drive electrodes 82 and 83 are all soaked in the electrolytic solution 85. In this example, for storage of the electrolytic solution 85, preferably, the container 86 may be made of a material having flexibility, and the 3D cross-linked polymer 81 or others are sealed therein. Alternatively, the container 86 may be provided with a layer for use to store therein an electrolytic solution exemplified by a porous element. Herein, the container 86 is preferably coated in the color of black on the upper surface, for example.

In the third embodiment, unlike the element to be curved in shape in the second embodiment, the element in use is to be displaced in the linear direction. In consideration thereof, the electrolytic solution 85 is preferably made of salt that causes a reversible redox reaction in a potential window of the solvent. The electrolytic solution 85 is exemplified by cyclic carbonates such as propylene carbonate (PC), ethylene carbonate (EC), butylene carbonate (BC), and vinylene carbonate (VC), chain carbonates such as dimethyl carbonate (DMC), diethyl carbonate (DEC), ethyl methyl carbonate (EMC), and dipropyl carbonate (DPC), aliphatic carboxylic acid esters such as methyl formate, methyl acetate, and ethyl propionate, γ-lactones such as γ-butyrolactones, chain ethers such as 1,2-diethoxyethane (DEE), and ethoxymethoxyethane (EME), cyclic ethers such as tetrahydrofuran, and 2-methyl tetrahydrofuran, a non-protic organic solvent including dimethyl sulfoxide, 1,3-dioxolane, formamide, acetamide, dimethylformamide, dioxolane, acetonitrile (AN), propylnitrile, nitromethane, ethyl monoglyme, phosphoric trimester, trimethoxymethane, dioxolane derivative, sulfolane, methyl sulfolane, 1,3-dimethyl-2-imidazolidinone, 3-methyl-2-oxazolidinone, propylene carbonate derivative, tetrahydrofuran derivative, ethyl ether, 1,3-propane sultone, anisole, N-methylpyrrolidone, and fluorocarboxylic ester, or a mixture of water, an ionic liquid, and ammonium perchlorate, tetraalkylammonium salt, a compound having the quinone skeleton, a metal complex of Os (osmium), Ru (ruthenium), Fe (iron) or Co (cobalt), a bipyridinium compound such as dimethyl bipyridinium, a compound in the structure of nicotinamide, a compound in the structure of riboflavin, and a compound in the structure of nucleotide phosphoric acid. Note that such examples as above are surely not restrictive.

Operation and Effects

Exemplary Operation of Polymer Actuator Element 80

FIG. 15B shows the state of the polymer actuator element 80 being curved in shape in response to an application of a voltage of a predetermined level from the power source E to the drive electrodes 82 and 83.

On the drive electrode 82 side with an application of a positive (+) potential, the first site A in the 3D cross-linked polymer 81 undergoes oxidation because the 3D cross-linked polymer 81 is in contact with the drive electrode 82, and thus the 3D cross-linked polymer 81 is mostly or entirely put in the state of oxidation, thereby swelling in the longitudinal direction thereof. On the other hand, on the drive electrode 83 side with an application of a negative (−) potential, observed is a reaction in which either or both of the electrolyte in the electrolytic solution 85 and the counterion of the oxidative-reductive site in the polymeric material undergo reduction. As a result of such a reaction, the 3D cross-linked polymer 81 swells in the direction of pushing the container 86 in the longitudinal direction. The container 86 thus become deformed in the longitudinal direction, i.e., the polymer actuator element 80 is extended in length.

Exemplary Operation of Display-Function-Provided Protrusion Pattern Forming Section 8

In the display-function-provided protrusion pattern forming section 8 of this third embodiment, the actuator 33 in the first and second embodiments is replaced with the actuator 88, which is provided with the above-described polymer actuator elements 80 on the surface. Such an actuator 88 operates like the actuator 33 described in the first embodiment. That is, in the state with no application of a drive signal to the drive electrodes 82 and 83, as shown in FIG. 15A, the polymer actuator element 80 does not change in shape and remains flat due to no potential difference between these drive electrodes, and the elastic sheet 31 remains flat and in the color of white. On the other hand, in the state with an application of a drive signal to the drive electrodes 82 and 83, as shown in FIG. 15B, the polymer actuator element 80 is extended in the longitudinal direction, and the extended portion pushes upward the elastic sheet 31. A protrusion is thus formed thereby. At the same time, the white liquid 42 in the elastic sheet 31 is moved to be away from the portion pushed by the protrusion from below, and on the resulting portion without the white liquid 42, a dot is displayed in the color related to the color of the upper surface of the container 86, i.e., black in this example.

Moreover, when a plurality of display elements are individually functioned as described above in the display-function-provided protrusion pattern forming section 8, any two-dimensional information such as Braille characters, characters, and images is to be displayed in a protrusion pattern together with a dot pattern in synchronization therewith. Such an operation is described in detail below.

Effects

As such, in this third embodiment, because the 3D cross-linked polymer 81 is so disposed as to enclose the drive electrode 82, the formation of a protrusion pattern may be implemented with clarity together with the display of a dot pattern thanks to a displacement of the resulting actuator element in the linear direction. The remaining effects are the same as those achieved in the first embodiment described above.

4. Modified Examples

While the invention has been described as above with several embodiments and modified examples thereof, but the invention is surely not restrictive thereto, and it is understood that numerous other modifications and variations may be devised.

In the embodiments described above, the elastic sheet 31 is formed with the partition walls 41, but this is surely not restrictive.

In the embodiments described above, the elastic sheet 31 is made of silicon rubber, but this is surely not restrictive. In this case, the material is preferably transparent and stretchy.

In the embodiments described above, the intermediate layer of the elastic sheet 31 is filled with a white liquid, but the liquid may be in any other colors. Still alternatively, the areas of the intermediate layer partitioned by the partition walls 41 may be filled with each different color of liquid. This enables to change the color of background during the display of a dot pattern so that the resulting display may be made with better flexibility. The color is not restrictive, but is preferable if the hue and lightness thereof are different from those of the color of the drive electrodes or others that will be the color of the resulting dot pattern. Also in this case, the liquid is preferably provided with the additional characteristics such as nonvolatility, oil-based, and low transparency.

In the embodiments described above, the actuator element is assumed as being only in two operation states with an application and no application of a voltage between the drive electrodes. Alternatively, a voltage for application may vary in level. If this is the case, the resulting display element may implement the intermediate tone of color in terms of the formation of protrusions and the display of dots.

In the embodiments described above, the mode of driving the polymer actuator elements is assumed as being the passive matrix mode, but the active matrix mode will also do.

In the embodiments described above, the actuator elements are the polymer actuator elements, but this is surely not the only option. That is, as an alternative to the polymer actuator elements, any other types of actuator elements will also do. Examples for an actuator element include a piezoelectric actuator, a dielectric elastic actuator, a shape memory alloy actuator, and others. If this is the case, the actuator element may operate in the direction vertical to the surface where the actuator element is in contact with the elastic sheet, and the actuator element may be changed in shape to a degree enough to push upward the elastic sheet 31.

In the embodiments described above, in the low-resolution display mode, a protrusion pattern and a dot pattern are both decreased in density by selection to be lower than the value defined by the original display data, but this is surely not restrictive. Alternatively, in the high-resolution display mode, a protrusion pattern and a dot pattern may be both increased in density to be higher than the value defined by the original display data. In this case, the memory 22 may be stored in advance with display data with a lower protrusion density and a lower dot density. Thereafter, when the high-resolution display mode is selected, the mode control section 22 may select the data based on the display data stored in the memory 22 as such, thereby increasing the number of dots in the display data. This thus enables the protrusion pattern forming device with a display function 1 to perform the display with a high resolution.

The polymer actuator elements in the second and third embodiments may each have the protruded end portion being spherical or spheroidical similarly to those in the first embodiment. The protruded end portions may be also colored.

The actuators in the second and third embodiments may include a plurality of actuator elements varying in color, and each having the protruded end portion in color similarly to those in the first embodiment.

The present application contains subject matter related to that disclosed in Japanese Priority Patent Application JP 2009-169243 filed in the Japan Patent Office on Jul. 17, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A protrusion pattern forming device with a display function, comprising:

a transparent elastic sheet having an internal layer including colored liquid; and an actuator including a plurality of actuator elements disposed along one surface of the elastic sheet, each of the actuator elements changing its own shape in response to an application of a voltage, thereby causing a second surface of the elastic sheet to protrude, wherein a protrusion pattern is formed on the elastic sheet, wherein the colored liquid is moved away from each of the protrusions in the protrusion pattern, and wherein a dot pattern corresponding to the protrusion pattern is displayed on the elastic sheet by selectively driving the plurality of actuator elements.

2. The protrusion pattern forming device according to claim 1, wherein the plurality of actuator elements each include an actuation member formed of an ion conductive polymer film, and changing its own shape to curve in response to the application of the voltage, and drive electrodes each formed on both surfaces of the actuation member.

3. The protrusion pattern forming device according to claim 2, wherein the ion conductive polymer film is made of a cation exchange resin.

4. The protrusion pattern forming device according to claim 2, wherein the drive electrode is made of carbon powder and an ion conductive resin.

5. The protrusion pattern forming device according to claim 2, wherein the actuation member is configured as a tongue-like portion formed by cutting out a U shape from a sheet made of the ion conductive polymer film.

6. The protrusion pattern forming device according to claim 1, wherein the plurality of actuator elements are each formed of a three-dimensional cross linked polymer.

7. The protrusion pattern forming device according to claim 1, wherein the colored liquid is different in color from a protruded tip of each of the actuator elements.

8. The protrusion pattern forming device according to claim 7, wherein the protruded tips of the plurality of actuator elements vary in color.

9. The protrusion pattern forming device according to claim 1, wherein the protruded tip is spherical.

10. The protrusion pattern forming device according to claim 1, wherein the elastic sheet has a partition wall to partition the internal layer into a plurality of areas.

11. The protrusion pattern forming device according to claim 1, further comprising:

a drive control section controlling the plurality of actuator elements for selective driving thereof, wherein the drive control section changes a protrusion density of the protrusion pattern and a dot density of the dot pattern by changing a number of the actuator elements for driving.

12. The protrusion pattern forming device according to claim 1, wherein a protruded tip of each actuator that is selectively driven acts on the elastic sheet and moves the colored liquid away from the protruded tip of the actuator to create a corresponding dot and a corresponding protrusion.

* * * * *